US007212981B2

(12) United States Patent
Blair et al.

(10) Patent No.: US 7,212,981 B2
(45) Date of Patent: May 1, 2007

(54) POSTAGE FRANKING DEVICE AND METHOD

(75) Inventors: Flory H. Blair, Washougal, WA (US); John D. Shoberg, Milwaukee, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 901 days.

(21) Appl. No.: 10/273,852

(22) Filed: Oct. 17, 2002

(65) Prior Publication Data

US 2004/0078347 A1 Apr. 22, 2004

(51) Int. Cl.
*G06Q 99/00* (2006.01)
*G06F 17/00* (2006.01)
*G07B 17/02* (2006.01)

(52) U.S. Cl. .............................. 705/1; 705/1; 705/408

(58) Field of Classification Search .................... 705/1, 705/400–408; 364/900; 197/1; 400/8, 88; 235/375; 177/126

See application file for complete search history.

(56) References Cited

U.S. PATENT DOCUMENTS

| | | | | |
|---|---|---|---|---|
| 3,599,738 | A * | 8/1971 | Wickenberg | 177/126 |
| 3,994,217 | A * | 11/1976 | Archila | 101/35 |
| 4,168,533 | A * | 9/1979 | Schwartz | 705/403 |
| 4,342,038 | A | 7/1982 | Lemelson | 346/9 |
| 4,436,439 | A * | 3/1984 | Koto | 400/322 |
| 4,506,344 | A * | 3/1985 | Hubbard | 705/401 |
| 4,799,560 | A * | 1/1989 | Kobayashi | 177/148 |
| 5,188,464 | A * | 2/1993 | Aaron | 400/103 |
| 5,593,236 | A * | 1/1997 | Bobry | 400/88 |
| 5,634,730 | A * | 6/1997 | Bobry | 400/88 |
| 5,685,651 | A * | 11/1997 | Hayman et al. | 400/88 |
| 5,801,364 | A * | 9/1998 | Kara et al. | 235/375 |
| 5,812,991 | A * | 9/1998 | Kara | 705/410 |
| 5,829,893 | A * | 11/1998 | Kinoshita et al. | 400/88 |
| 5,848,401 | A | 12/1998 | Goldberg et al. | 705/408 |
| 5,895,893 | A * | 4/1999 | McMillian | 177/126 |
| 5,988,900 | A * | 11/1999 | Bobry | 400/88 |
| 2005/0071297 | A1* | 3/2005 | Kara | 705/410 |
| 2005/0256811 | A1* | 11/2005 | Pagel et al. | 705/401 |

FOREIGN PATENT DOCUMENTS

EP 1113402 * 12/2000

OTHER PUBLICATIONS

"Postal Scale: mailrooms can't work without them.", Office v110, n2, p. 44, Aug. 1989.*

* cited by examiner

*Primary Examiner*—John W. Hayes
*Assistant Examiner*—Rutao Wu

(57) ABSTRACT

One embodiment of the present invention is directed to a postage franking device that includes a scale, an envelope holder and a printer. The envelope holder is suspended from the scale and defines a print zone. The printer, which is supported by the holder, is configured to apply imaging material to an envelope in the print zone.

29 Claims, 9 Drawing Sheets

POSTAGE FRANKING DEVICE AND METHOD

This disclosure relates generally to postage franking systems, and more particularly to a postage franking system including a franking device and method.

In the past, applying postage to an envelope in an office environment typically meant either moving from one's desk to a postage franking device in a central mail room or work area, or applying preprinted stamps at one's own desk. In either the office environment or a home environment, applying preprinted stamps typically requires guessing at the amount of postage required for a particular sealed envelope. Unfortunately, guessing at the correct postage often resulted in applying excess postage and wasting money, or not applying enough stamps and then posting the envelope with postage due to be paid by the recipient. Even the use of a small desktop scale upon which an envelope was placed to determine the envelope's weight required a user to keep a supply of stamps on hand, and often the correct denomination was unavailable for incremental weights above the minimum (e.g., above one ounce in the United States for first class mail), again resulting in overpayment. Alternatively, for those without a desktop scale or those not in an office environment with a central mail room, a visit to the post office during normal business hours was required to have the envelope weighed to determine the correct amount of postage, which typically was then applied by the postal clerk.

SUMMARY

One embodiment of the present invention is directed to a postage franking device that includes a scale, an envelope holder and a printer. The envelope holder is suspended from the scale and defines a print zone. The printer, which is supported by the holder, is configured to apply imaging material to an envelope in the print zone. Another embodiment of the invention is directed to a postage franking method that includes suspending an envelope from a scale, weighing the suspended envelope with the scale, determining postage for the envelope based on its weight and printing the postage on the suspended envelope. These and other embodiments of the invention may be adapted for use in small hand held postage franking devices that help relieve some of the inconveniences associated with conventional postage franking techniques.

DETAILED DESCRIPTION

Figure 1:
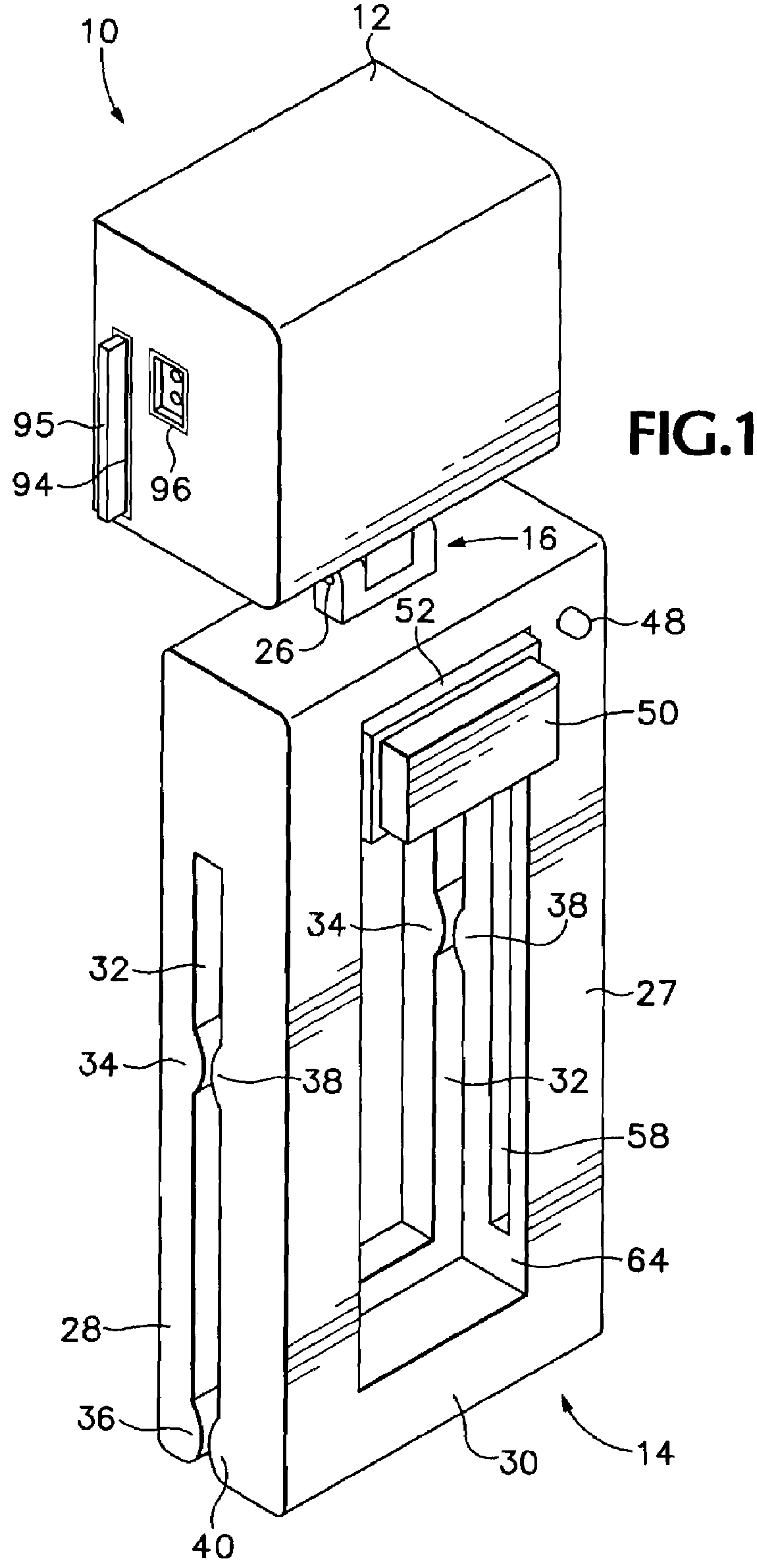
FIG. 1 is a perspective view of a postage franking device according to one embodiment of the invention in which a single printer moves across the print zone.

FIGS. 1 through 5 illustrate a postage franking device 10 according to one embodiment of the invention. Referring to FIGS. 1–5, postage franking device 10 includes a head 12 and a body 14 coupled together by a neck 16. The head 12 includes an onboard power source, such as a replaceable battery or batteries 18, and a scale 20, selected to weigh a variety of different weights of envelopes in accordance with a user's desired implementation. In the illustrated embodiment, the neck 16 includes an upper portion 22 coupled to a weighing arm of scale 20. A variety of different weighing devices may be used. The illustrated scale 20 may operate in the same fashion as a vegetable scale in a grocery store or as a fishing scale having a weighing arm from which anglers hang their fish to determine the weight of their catch. Preferably, scale 20 will provide an electronic signal indicative of an envelope's weight. The neck 16 also includes a lower portion 24 extending from the body 14. The upper neck portion 22 is pivotally coupled to the lower neck portion 24 by a pivot pin or post 26, which allows the body 14 to pivot into an insertion position for ease of use, as shown in dashed lines in FIG. 4.

Figure 4:
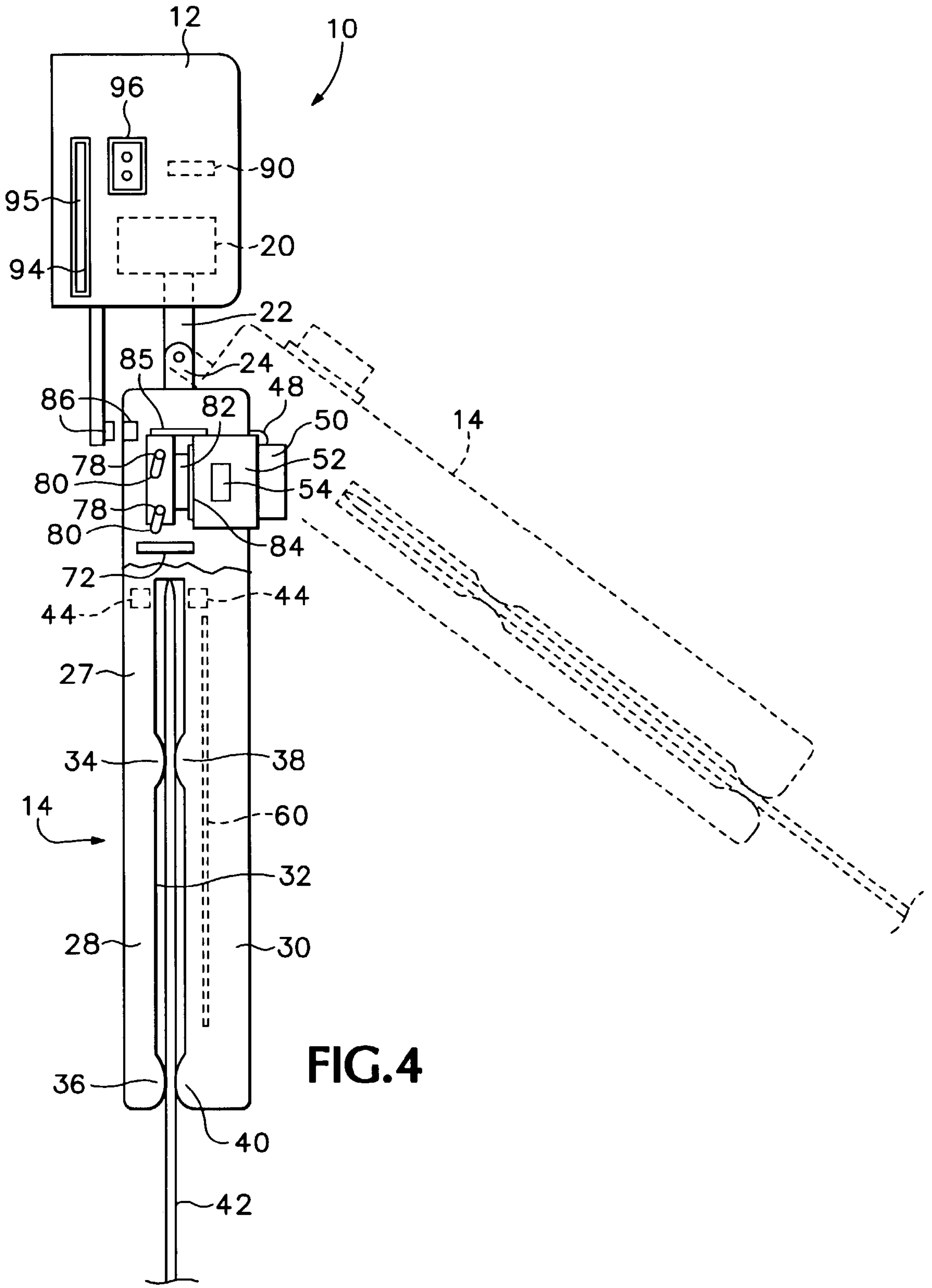
FIG. 4 is a left side elevation view of the postage franking device of FIG. 1 prior to franking, with an alternate position for easy envelope insertion shown in dashed lines.
Figure 5:
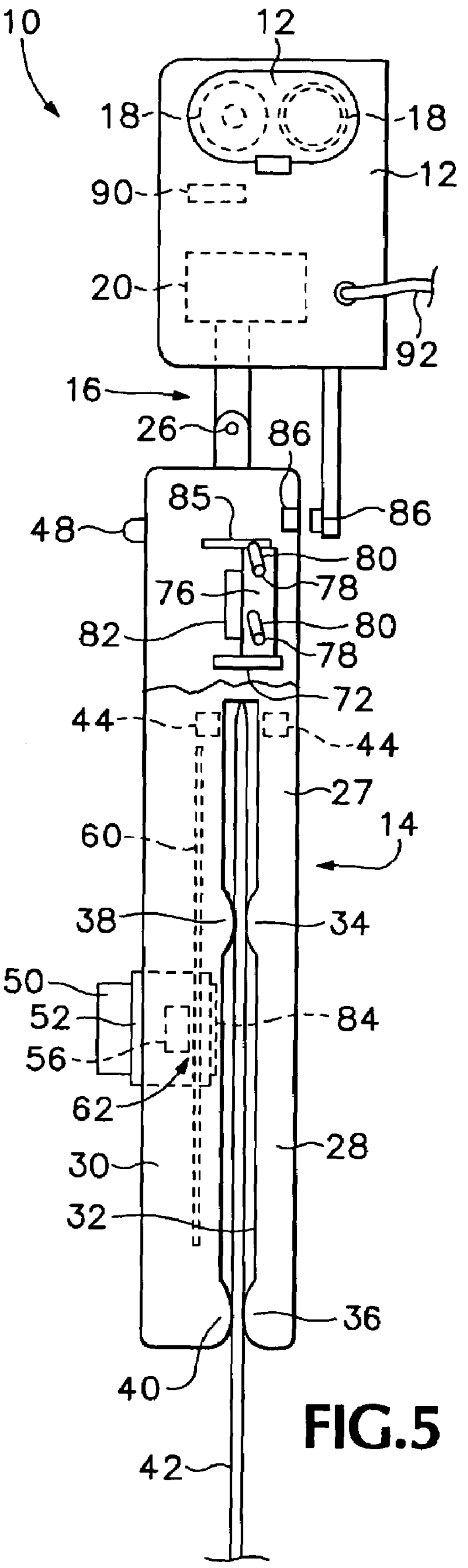
FIG. 5 is a right side elevation view of the postage franking device of FIG. 1, shown during the franking process.

The body 14 includes an envelope holder 27, here illustrated as opposing jaws 28 and 30, which may also be referred to as a lower jaw 28 and an upper jaw 30 when rotated into the insertion position shown in dashed lines in FIG. 4. The jaws 28 and 30 define a slot 32 and each jaw has opposing envelope gripping features, such as teeth or nibs 34 and 36 projecting from jaw 28 that meet with nibs 38 and 40, respectively, projecting from jaw 30 to narrow the width of slot 32 at these locations. As shown in FIGS. 4 and 5, the opposing pairs of nibs 34, 38 and 36, 40 cooperate to grip an inserted envelope 42 to secure the envelope in position for the franking process.

Figure 2:
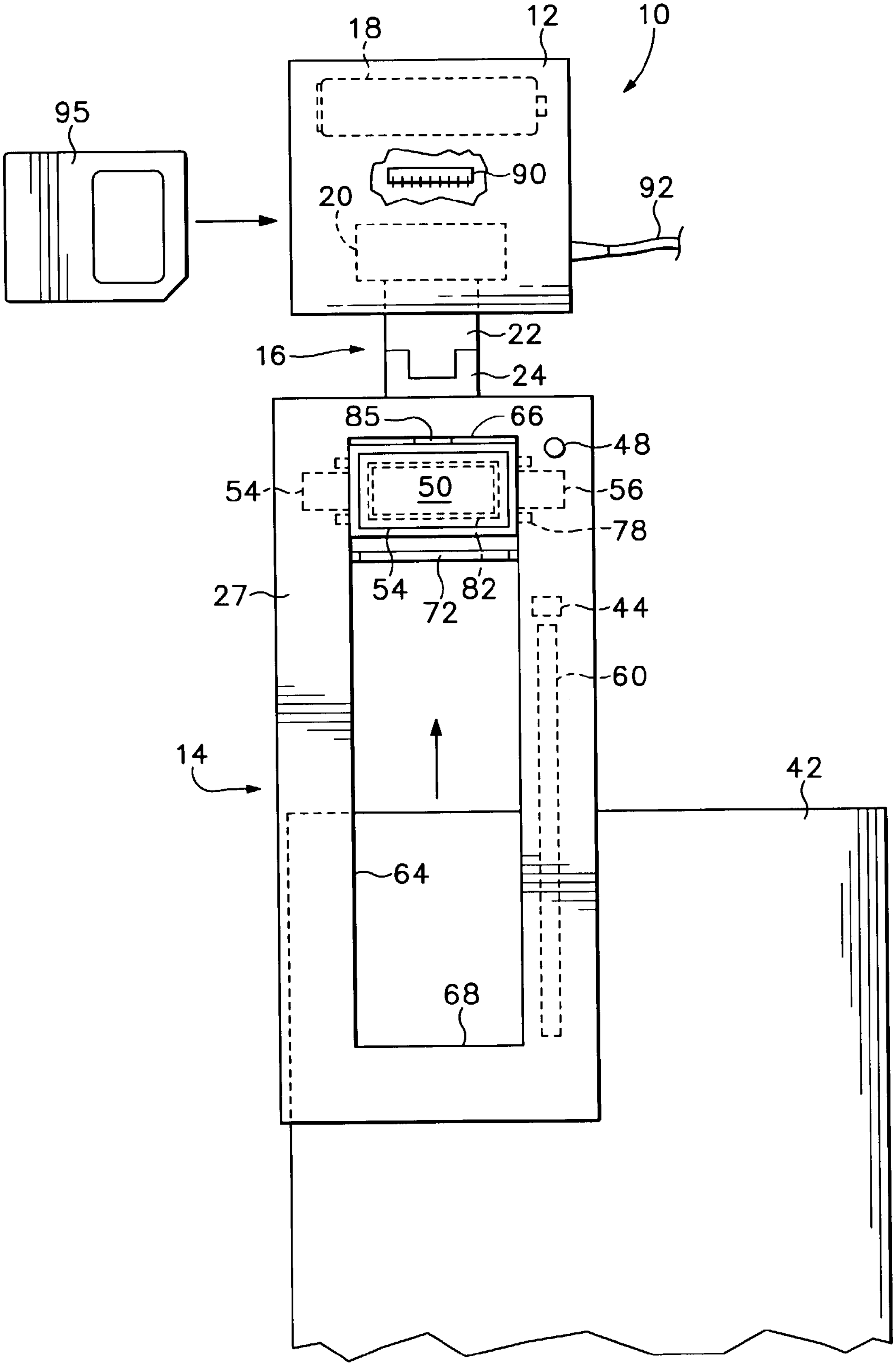
FIG. 2 is a front elevation view of the postage franking device of FIG. 1, shown with an envelope being inserted into the device.
Figure 3:
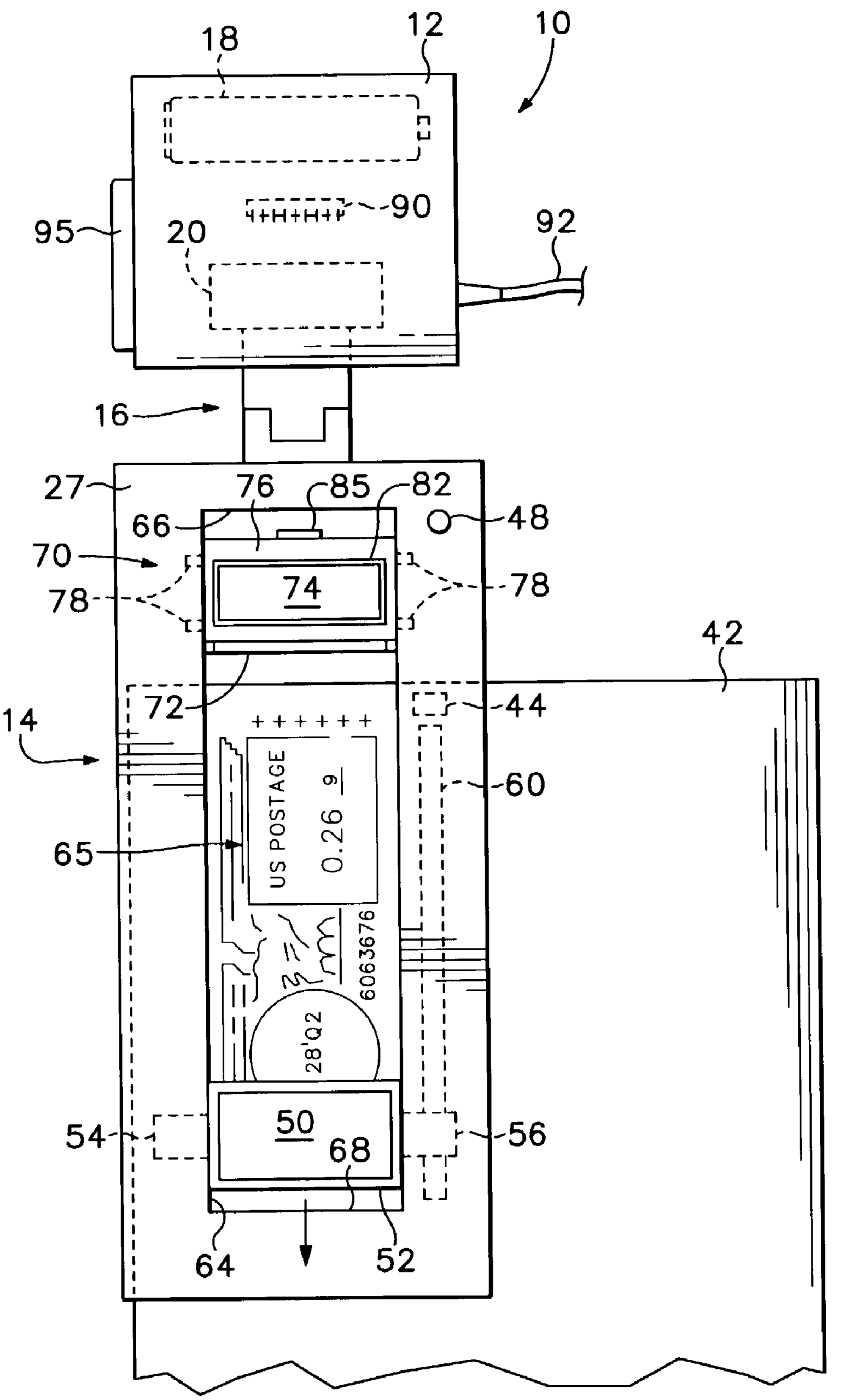
FIG. 3 is a front elevation view of the postage franking device of FIG. 1, shown when postage is applied to the envelope.

FIG. 2 shows the envelope 42 being inserted into the holder 27, with the final location for franking being shown in FIGS. 3 through 5. Preferably, the body 14 is equipped with a sensor 44 that senses the presence of envelope 42 when it is in the correct position for franking, here, being fully inserted in slot 32. For instance, the sensor 44 may be an optical sensor unit having optical communication which is blocked by the presence of envelope 42, with an envelope engagement or insertion signal being generated when the envelope 42 is properly positioned for weighing and franking. To indicate to a user that the envelope 42 is fully inserted within holder 27 and ready for franking, an indicator light 48 may be provided on either the head 12 or the body 14, for instance, with the light 48 changing from red to green upon proper insertion.

The postage franking device 10 includes an imaging member, represented in this embodiment as a printer 50 carried by a sliding carriage of 52. While printer 50 represents generally any suitable imaging member, a replaceable printing cartridge using inkjet imaging technology, such as thermal or piezoelectric inkjet printheads or other commercially available inkjet printhead technology is preferred because it is small, available commercially and easily adapted for use in a small postage franking device. For instance, one replaceable inkjet print cartridge sold by the Hewlett-Packard Company of Palo Alto, Calif., is the "hp 34" black inkjet print cartridge, product number C6634AN, although other inkjet cartridges may be more suitable in other implementations, such as those employing semipermanent printheads where only the ink supply is normally replaced, known in the industry as a "snapper" cartridge. Of course, while the "hp 34" cartridge is supplied with black ink, the technology employed in producing this cartridge may be used to dispense other colors of ink should they be desired or required. Indeed, using current inkjet printhead technology, printheads having nozzles expanding a length which extends the entire postage printing width may be constructed to carry permanently attached or to receive replaceable ink reservoirs.

The carriage 52 is supported in holder 27 by a pair of opposing carriage support arms 54, 56 which slide in slots 58, shown in FIG. 1, in upper jaw 30. If positional feedback as to the location of carriage 52 and printer 50 along the guide slots 58 is desired, an optical, magnetic or other suitable encoder strip 60 and a corresponding encoder strip reader 62, shown in FIG. 5, may be located along one of the arm guide slots 58 to read the position of carriage 52 and printer 50 along slots 58. Optical carriage position feedback mechanisms are typically employed in the inkjet printing arts, and may take on a variety of different configurations, for example, with the encoder strips being either of a clear plastic bearing various markings, or a metallic encoder strip having various windows cut therethrough. Indeed, the encoder strip markings may be embedded within one of the carriage arm guide slots 58, and formed as an integral part thereof or as a separate component attached thereto.

Printer 50 travels across a print zone opening 64 in holder 27 to apply a postage image 65 to envelope 42. Print zone 64 is configured as necessary to expose to printer 50 that portion of envelope 42 on which the desired postage 65 is printed. In most applications, therefore, print zone 64 will be configured to expose the upper right hand corner of envelope 42, as shown in FIG. 3. The print zone 64 may be characterized by an upper border 66 and a lower border 68, with the carriage 52 being located adjacent to the upper border 66 in FIG. 2, and closer to the lower border 68 in FIG. 3.

A single printer 50 that travels back and forth across print zone 64 is illustrated in FIGS. 1–5. In some implementations, however, it may be desirable to employ two or more stationary printers, such as printers 50*a*–50*c* shown in FIG. 8 or a single stationary printer with multiple print heads, such as printer 50 with print heads 51*a*–51*e* in FIG. 9, to cover print zone 64.

The embodiment of franking device 10 shown in FIGS. 1–5 includes a printhead service station 70. The components of service station 70 are shown in FIGS. 2–5. The service station 70 includes an elastomeric wiper 72 and a capping unit 74. The wiper 72 may be constructed of a resilient, non-abrasive, elastomeric material, such as nitrile rubber, ethylene polypropylene diene monomer (EPDM), or other comparable materials known in the art which are compatible with the ink dispensed by the printer 50. A variety of different printhead wiper designs are known in the inkjet arts, and for clarity, the wiper 72 is shown as a rectangular elastomeric blade projecting upwardly from the lower jaw 28.

The capping unit 74 includes a movable sled 76 which is supported by four sled support posts 78, with each post 78 riding within an associated slot 80 defined by the upper jaw 30. Each of the slots 80 are at an angle with respect to a plane of carriage travel defined by the carriage arm guide slots 58. The sled 76 carries an elastomeric sealing lip 82 sized to surround a group of ink ejecting nozzles defined by a printhead portion 84 (see FIGS. 4 and 5) of the inkjet cartridge 50. The sealing lip 82 may be constructed of the same material used to construct wiper 72, as described above. A variety of different styles of caps, sleds, and cap venting systems are known in the inkjet arts, and may be suitably employed or modified in constructing the capping unit 74, as well as in assembling servicing units for printheads 50*a*–50*c* and 51*a*–51*e* of FIGS. 8 and 9, respectively. Indeed, some of the more sophisticated inkjet printhead servicing units, such as that used in the Hewlett-Packard Company's HP 2000C Professional Series Color Inkjet Printer, employ separate motors, cams and other mechanisms to move servicing components, such as caps and wipers into engagement with inkjet printheads for servicing.

To move the sled 76 between a rest position as shown in FIGS. 3 and 5, and an active capping or sealing position as shown in FIGS. 2 and 4, the capping unit 74 includes an activation arm 85 which extends outwardly from the sled 76. From the rest position of FIGS. 3 and 5, the printer carriage 52 upon returning to the service station 70, contacts the activation arm 85 and pushes the sled 76 to travel in an upward direction along slots 80 toward the printhead 84, until the cap lip 82 is tightly sealed to surround the ink ejecting nozzles in the sealing position of FIGS. 2 and 4. In the sealing position of FIG. 2, the activation arm 85 has been pushed adjacent to the window upper border 66, while in the rest position of FIG. 3, the sled 76 has traveled downwardly, under the force of gravity, in slots 80 to define a gap between arm 85 and border 66. This downward travel of the sled 76 away from the cartridge 50 disengages cap 82 from the printhead 84 in an uncapping action, due to the slanted orientation of slots 80 with respect to a path of carriage travel defined by the arm guide slots 58. Similar ramped capping action has been used in the inkjet arts for years to seal inkjet printheads during periods of inactivity, with a carriage being used to position the cap sled between an active capping position and a resting uncapped position. Indeed, other capping systems may also be used to seal printhead 84 including more complicated motorized mechanisms and the like, with the illustrated capping system being preferred for its light weight, simplicity, and reliability.

The arrangement of the illustrated service station 70 allows the printhead 84 following uncapping to be cleaned by wiper 72 prior to entering the print zone 64, so the ink ejecting nozzles are cleaned prior to printing. Furthermore, following printing, the wiper 72 cleans the printhead 84 prior to being capped for storage. Moreover, while a single wiper blade 72 is illustrated, in some implementations multiple wiper blades may prove useful, as well as wiper blades having non-rectangular contours. More advanced service station designs may include other printhead servicing features, such as printhead primers, ink solvent applicators, and scrapers for removing ink residue from the wiper blade 72. Again, while more elaborate and complicated service station designs may be employed in the postage franking device 10, the illustrated service station 70 is preferred for its simplicity, reliability and economic value.

Due to the pivotal attachment of the head 12 to the body 14 by pivot pin 26, holder 27 may be rotated with respect to the head 12 to facilitate easier insertion of envelope 42 into slot 32, as shown in dashed lines in FIG. 4. Allowing this rotation of holder 27 may be particularly useful when the franking device 10 is suspended from a wall, file cabinet, divider or other vertical surface. Following this rotation to insert envelope 42, the holder 27 should be rotated downward into the hanging position illustrated in solid lines in FIG. 4 to assure accurate weighing by scale 20. To determine when the holder 27 has been rotated back into the weighing position, the postage franking device 10 includes a position sensor 86. Sensor 86 generates a signal indicative of whether the holder 27 is in an insertion position (dashed lines in FIG. 4) or oriented in a weighing position (solid lines in FIG. 4).

The postage franking device 10 includes a controller 90 housed within the head 12. The controller 90, a microprocessor or an application-specific integrated circuit (ASIC) for example, is electronically coupled to scale 20 and printer 50. Controller 90 is configured to receive input signals from scale 20 and to generate output signals for printer 50 in response to the input signals. One set of output signals generated by controller 90, for example, are firing signals for selectively firing each of the printhead nozzles in printer 50 to eject ink in a selected pattern, such as the postage franking pattern 65 shown printed on the envelope 42 in FIG. 3 within the print zone 64.

Also coupled to the head 12 and electrically coupled to controller 90 is an electrical conductor 92. In one embodiment, electrical conductor 92 may be coupled to a computer to transport electrical control signals between controller 90 and the computer. In another embodiment, the electrical conductor 92 may be used to supply power to the postage franking device 10, thereby eliminating the need for a battery unit 18, or relegating the battery unit for portable or backup power use.

The head 12 may be equipped with one or more slots 94 configured to receive a memory card 95, or other storage device. Preferably the memory card 95 is a read/write device which carries various information concerning weights vs. postal rates for use by controller 90 to allow the postage franking device 10 to be easily updated for changes in postal rates. Furthermore, the memory card 95 may also be used to store postage credits, and could be sold by the postal service, with the controller 90 deducting credits as they are used when franking an envelope as shown in FIG. 3. Alternatively, the memory card 95 may be used to store postage debits, which may then be periodically deducted from a user's account, for instance, by inserting the card into a reader on a user's computer which is coupled through the Internet to a user's postage account. In a further alternative embodiment, the memory card 95 may be eliminated, and such postage credit or debit information may be communicated from the postage franking device 10 via conductor 92 to a user's computer and then to the Internet to the postage account.

Instead of using either conductor 92 or the memory card 95 to communicate postage information, the head 12 may be connected with an infrared communication port 96, or similar communications port which does not require physical linking of the franking device 10 with a user's computer. In such an embodiment, placing the infrared communication port 96 adjacent to a computer's infrared communication port is adequate to communicate postage debit and credit information between the franking device 10 and the postage account tracking system.

Figure 6:
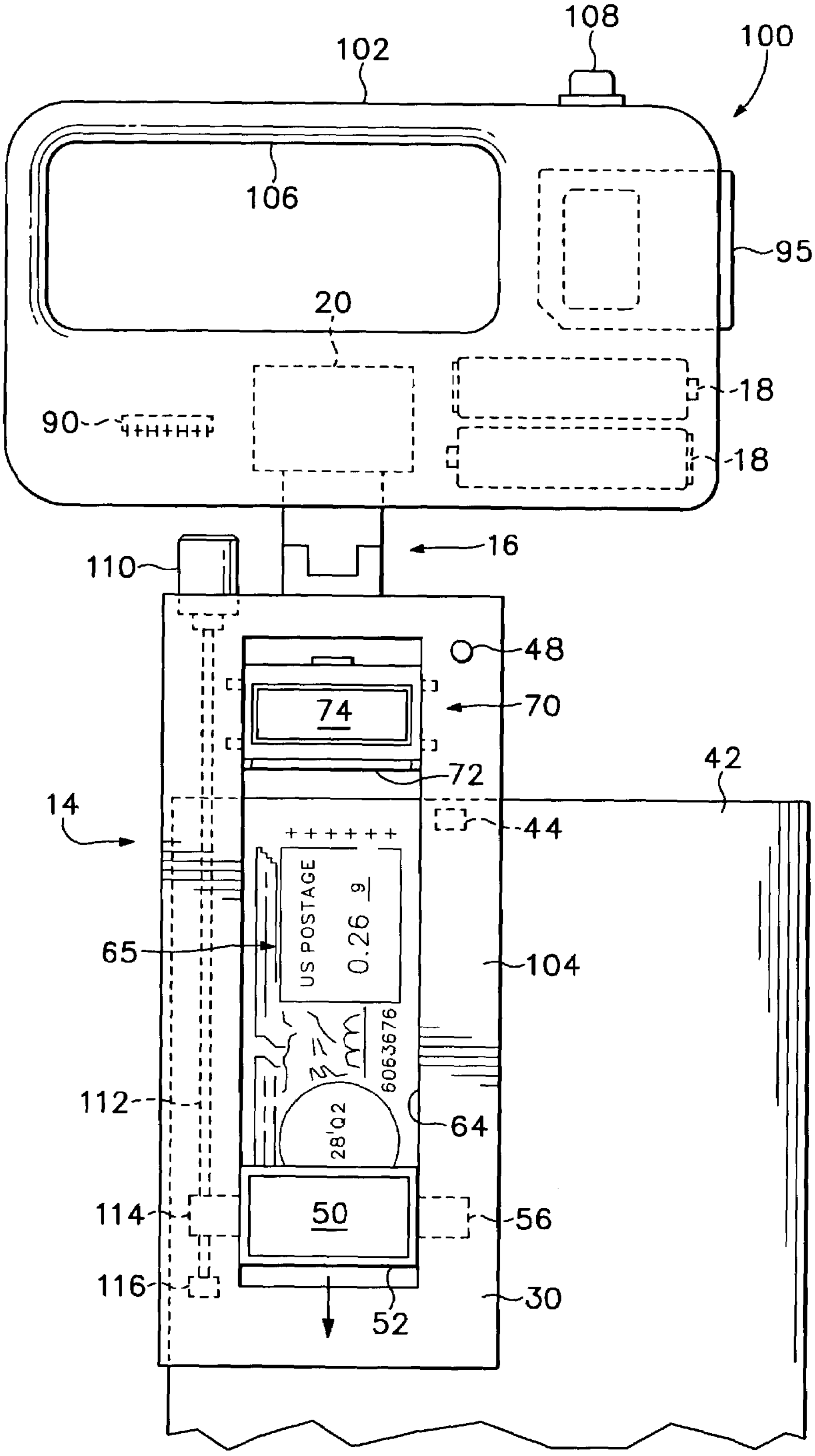
FIG. 6 is a front elevation view of a postage franking device according to another embodiment of the invention in which the printer is driven across the print zone.

FIG. 6 illustrates a franking device 100 in accordance with another embodiment of the invention in which the printer 50 is automatically driven across the print zone 64 with a motor. Several of the components shown in FIG. 6 may be constructed as described above with respect to franking device 10 shown in FIGS. 1 through 5, and are thus numbered accordingly. Referring to FIG. 6, franking device 100 includes a head 102 and a body 104 which may be coupled together by a neck 16 as described above, including a sensor 86 to signal controller 90 when the holder 27 is in a free hanging position with the envelope 42 ready for weighing. As mentioned previously, rather than using a pivoting neck 16, a solid neck portion may be used instead to couple the body 104 to the weighing arm of scale 20. In contrast to the franking device 10 of FIGS. 1 through 5, the franking device 100 has a head 102 with a convenient handle 106 which allows a user to grip the head 102 with their fingers, and activate a start button 108 supported along the top surface of the head 102. Of course, prior to activating the start button 108, the indicator light 48 should first indicate that the envelope 42 has been properly inserted within holder 27 in response to a correct insertion signal from sensor 44.

The postage franking device 100 includes a motor 110, which operates upon activation of the start button 108. The motor 110 drives a lead screw 112 located along the print zone 64. The lead screw 112 is threaded into and drives printer carriage 52 through an internally threaded receptacle 114. At the end of print zone 64, the lead screw 112 terminates at a stop 116 to end travel of the carriage 52. In this embodiment, the carriage support arm 56 moves in guide slot 58 as described above with respect to FIGS. 1 through 5 to keep the carriage 52 properly aligned while traveling across the print zone 64.

Figure 7:
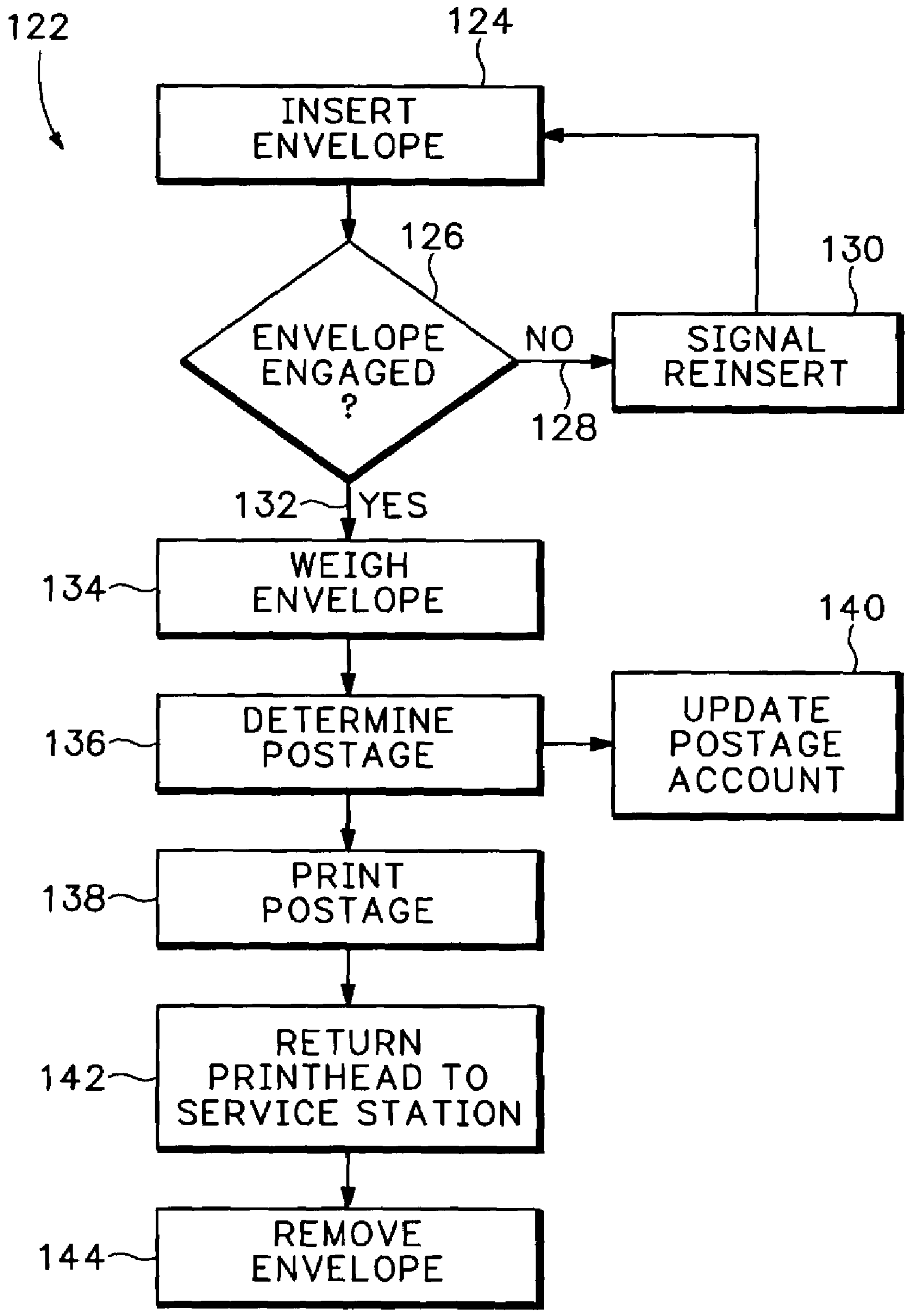
FIG. 7 is a flowchart illustrating a postage franking method according to another embodiment of the invention.

FIG. 7 illustrates a postage franking method 122 according to one embodiment of the invention. Referring to FIG. 7, an envelope 42 is suspended from scale 20 by inserting the envelope into holder 27 (step 124). If a position sensor 44 is used, then a determination is made as to whether the envelope 42 is inserted fully to the proper position (step 126). If the envelope 42 is not inserted fully, as indicated by a NO signal 128 from sensor 44, the user is signaled to reinsert the envelope 42 (step 130), for instance, by leaving the indicator light 48 emitting red light. If the envelope 42 is inserted fully, as indicated by a YES signal 132 from sensor 44, which preferably causes the indicator light 48 to emit a different color, such as green light, the envelope 42 is weighed (step 134). The desired postage is determined based on the weight of the envelope (step 136). While it is expected that the controller 90 will usually compute postage based on a signal from scale 20 corresponding to the weight of envelope 42, if an external link, such as conductor 92, is used, postage information may be obtained via conductor 92 by a computer remote from the postage franking device 10.

Figure 8:
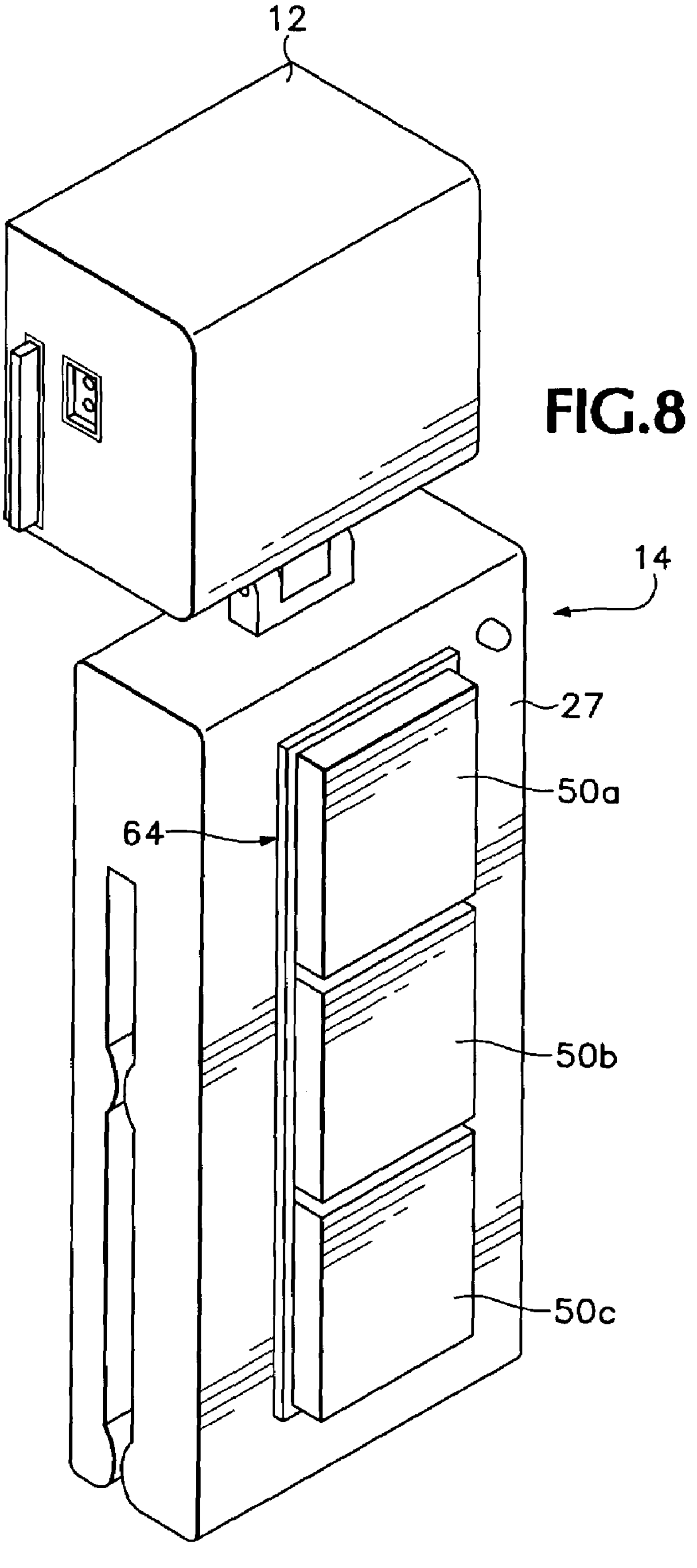
FIG. 8 is a perspective view of a postage franking device according to another embodiment of the invention in which multiple stationary printers are used to cover the print zone.
Figure 9:
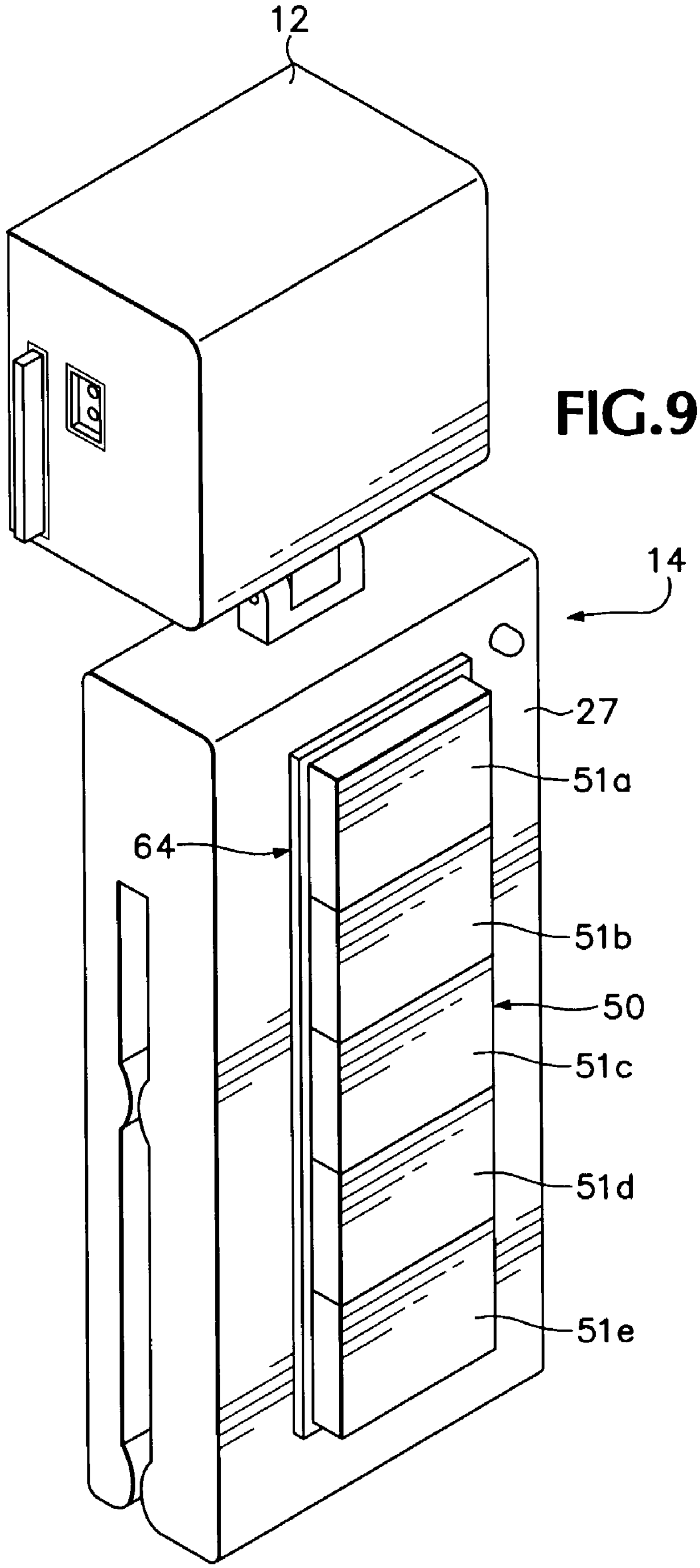
FIG. 9 is a perspective view of a postage franking device according to another embodiment of the invention in which a single stationary printer with multiple print heads is used to cover the print zone.

After the correct postage has been determined in step 136, a print postage/franking step 138 may be performed. In a motor driven or automatic embodiment of franking device 100 in FIG. 6, controller 90 issues a drive signal to motor 110 and printhead firing signals to the inkjet printer 50, which then operate in a coordinated fashion using inkjet technology to print the postage on envelope 42, forming an image 65 in print zone 64 with the correct postage for the weight of the particular envelope being franked. In the manual embodiment of franking device 10 in FIGS. 1 through 5, the print postage step 138 involves having a user grip the printer 50 or more preferably the carriage 52, and scan the printer 50 across print zone 64. In some implementations, the carriage 52 may be equipped with a handle which extends over the printer 50, so the carriage is moved rather than risking having the operator unseat printer 50 during scanning. During manual scanning, the controller 90 receives positional feedback from the encoder reader 62 mounted on carriage support arm 56 (FIG. 5) as the reader monitors the encoder strip 60. The controller 90 then coordinates firing of the ink ejecting nozzles of the printhead 84 to print the postage 65 on envelope 42, as shown in FIG. 3. For the automated franking device 100 of FIG. 6, the position of carriage 52 can be determined by counting the number of turns of motor 110 or the lead screw 112, with the number of turns being correlated with carriage position at the factory and stored within controller 90. The franking step 138 in the embodiments of FIGS. 8 and 9 is accomplished through the issuance of firing signals to the printheads 50*a*–50*c* and 51*a*–51*e*, respectively, without requiring printhead motion.

Following the franking step 138, the controller 90 updates the postage account in step 140 by storing the amount of postage within a portion of the controller, or on memory card 95. Alternatively, the postage just printed may be relayed to a computer via cable 92, or at some later point after accumulation of postage relayed to a computer via infrared port 96. As explained above, if postage credits are stored the memory card 95, then the credits are spent or deducted during the updating step 140. Alternatively, the controller 90 or memory card 95 may accumulate postage debits, which are then deducted by inserting the memory card 95 into a receptacle on a central computer, or by linking controller 90 via infrared port 96 to a computer or other postage accounting device.

Following the franking step 138, in a returning step 142, the printer 50 is returned to service station 70, either manually by an operator when using franking device 10, or automatically using motor 110 when using franking device 100. In the embodiment of FIGS. 8 and 9, a servicing unit may be engaged with printheads 50*a*–50*c* and 51*a*–51*e* via manual means, such as by moving a lever, or by automatic means, such as by using a motor. On returning to the service station 70, the printhead orifice plate 84 is cleaned by wiper 72, and carriage 52 contacts activation arm 85 to elevate the cap sled 76 to the sealing position shown in FIGS. 2 and 4. Following the returning step 142, an operator removes the envelope from jaws 28 and 30 in step 144. In some manual implementations it may be desirable to have the carriage 52 be spring biased toward the service station 70, such that upon completion of the franking step 138, the carriage automatically returns to the service station, rather than relying on a user remembering to push the carriage back. Such an automatic carriage return feature would prevent a user from accidentally leaving the printhead uncapped during periods of printing inactivity and thus avoid letting the printhead dry out.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A postage franking device, comprising:
a scale;
an envelope holder suspended from the scale, the holder defining a print zone at a location on an envelope proper for franking when the envelope is held in the holder in a correct position for franking; and
a printer integral to the holder, the printer configured to apply imaging material to an envelope in the print zone.

2. The device of claim 1, wherein the holder has an opening therein defining the print zone.

3. The device of claim 1, wherein the printer is movable across the print zone.

4. The device of claim 1, wherein the printer comprises a stationary printer covering the print zone.

5. The device of claim 1, wherein the holder is pivotally suspended from the scale.

6. A postage franking device, comprising:
a scale;
an envelope holder suspended from the scale, the holder defining a print zone at a location on an envelope proper for franking when the envelope is held in the holder in a correct position for franking;
a printer integral to the holder, the printer movable across the print zone; and
a controller electronically coupled to the scale and the printer, the controller configured to receive information from the scale and direct the printer to print a desired postage in response to information received from the scale.

7. The device of claim 6, wherein information from the scale corresponds to the weight of an envelope held in the holder and the controller is configured to determine the desired postage based on information received from the scale.

8. The device of claim 6, wherein the printer is automatically movable across the print zone at the direction of the controller.

9. A postage franking device, comprising:
a scale;
an envelope holder pivotally suspended from the scale, the holder having an opening therein defining a print zone and the holder pivotable between a first position in which the holder and the scale are aligned with one another and a second position in which the holder and the scale are angled with respect to one another; and
a movable printer supported by the holder, the printer configured to print a desired postage on an envelope in the print zone.

10. The device of claim 9, wherein the movable printer is configured to print the postage based on a signal from the scale corresponding to the weight of an envelope.

11. The device of claim 10, further comprising a controller electronically coupled to the scale and the printer, the controller configured to receive the signal from the scale corresponding to the weight of an envelope and direct the printer to print the postage based on the signal received from the scale.

12. The device of claim 11, wherein the scale is operative to generate the signal when the holder and the scale are aligned with one another.

13. A postage franking device, comprising:
a scale;
an envelope holder pivotally suspended from the scale, the holder having an opening therein defining a print zone at a location on an envelope proper for franking when the envelope is held in the holder in a correct position for franking;
a carriage movably mounted to the holder adjacent to the print zone;
a printer carried by the carriage;
a motor;
a lead screw operatively connected to the carriage and the motor such that, upon rotation of the lead screw at the urging of the motor, the carriage carries the printer back and forth across the print zone; and
a controller electronically coupled to the scale, the printer and the motor, the controller configured to receive information from the scale, start and stop the motor to drive the carriage back and forth across the print zone and direct the printer to print a desired postage in response to information received from the scale.

14. The device of claim 13, further comprising a first sensor supported by the holder near the print zone, the first sensor electronically coupled to the controller and the first sensor operative to output a signal to the controller indicating the envelope is in the correct franking position in the print zone.

15. The device of claim 14, further comprising an indicator light responsive to the output signal from the first sensor.

16. The device of claim 13, further comprising a second sensor supported by the holder near the print zone, the second sensor electronically coupled to the controller and the second sensor operative to output a signal to the controller indicating the position of the printer along the print zone.

17. The device of claim 16, wherein the second sensor comprises an encoder strip on the holder and an encoder strip reader on the carriage.

18. The device of claim 13, further comprising a printer service station supported by the holder at one end of the print zone.

19. The device of claim 13, wherein the controller resides on the printer.

20. A postage franking method, comprising:

suspending an envelope from a scale;

weighing the suspended envelope with the scale;

determining postage for the envelope based on the weight of the envelope; and printing the postage on the suspended envelope.

21. The method of claim 20, wherein the act of suspending comprises inserting the envelope into a holder and suspending the holder from the scale.

22. The method of claim 20, further comprising sensing when the envelope reaches a proper position in the holder and wherein the act of weighing is performed after the act of sensing.

23. The method of claim 20, wherein the act of printing includes automatically moving a printer across a portion of the envelope.

24. The method of claim 20, wherein the act of printing includes manually moving a printer across a portion of the envelope.

25. A postage franking method, comprising:

suspending an envelope from a scale;

weighing the suspended envelope;

determining postage for the envelope based on the weight of the envelope;

moving a printer across a portion of the suspended envelope;

monitoring the position of the printer moving across the envelope; and as the printer is moving across the envelope, printing the postage on the suspended envelope.

26. The method of claim 25, further comprising automatically servicing the printer.

27. The method of claim 1, wherein the envelope holder defining a print zone at a location on an envelope proper for franking when the envelope is held in the holder in a correct position for franking comprises the envelope holder defining a print zone at an upper right hand corner of an envelope when the envelope is held in the holder in a correct position for franking.

28. A postage franking device, comprising:

a head including a scale and a power source operatively connected to the scale; and a body pivotally suspended from the head and operatively connected to the scale, the body including an envelope holder, a printer, and a sensor operatively to sense the presence of an envelope in a correct position for franking, the scale operative to provide an electronic signal indicative of a weight of an envelope held in the body and the printer operative to apply imaging material to an envelope in the correct position for franking.

29. The device of claim 28, wherein the envelope holder comprises opposing jaws forming a slot into which an envelope may be inserted and one or both jaws having a envelope gripping feature for holding the envelope in the slot.

* * * * *

UNITED STATES PATENT AND TRADEMARK OFFICE

CERTIFICATE OF CORRECTION

PATENT NO. : 7,212,981 B2
APPLICATION NO. : 10/273852
DATED : May 1, 2007
INVENTOR(S) : Flory H. Blair et al.

It is certified that error appears in the above-identified patent and that said Letters Patent is hereby corrected as shown below:

In column 10, line 29, in Claim 28, delete “operatively” and insert -- operative --, therefor.

Signed and Sealed this

Sixteenth Day of June, 2009

JOHN DOLL

*Acting Director of the United States Patent and Trademark Office*